United States Patent [19]

Kruh

[11] 4,182,853

[45] Jan. 8, 1980

[54] PROCESS OF BREAKING UP GEL OF POLYAMIDE-IMIDE

[75] Inventor: Daniel Kruh, East Brunswick, N.J.

[73] Assignee: General Electric Company, Waterford, N.Y.

[21] Appl. No.: 402,955

[22] Filed: Oct. 3, 1973

Related U.S. Application Data

[62] Division of Ser. No. 734,861, Jun. 6, 1968, abandoned.

[51] Int. Cl.$^2$ ............................................. C08G 73/14
[52] U.S. Cl. ................................... 528/503; 528/125; 528/172; 528/189; 528/229; 528/352; 528/353; 528/502
[58] Field of Search ................ 260/47 CP, 65, 78 TF; 528/502, 503, 125, 189, 352, 353, 229, 172

[56] References Cited

U.S. PATENT DOCUMENTS

3,485,796  12/1969  Naselow ................................ 260/47

Primary Examiner—Lester L. Lee
Attorney, Agent, or Firm—John L. Young; Joseph B. Forman

[57] ABSTRACT

New and useful polyamideimide polyamines are disclosed which are used to prepare polyamideimide amic acids and polyamideimideimides useful as films, coatings and adhesives.

1 Claim, No Drawings

PROCESS OF BREAKING UP GEL OF POLYAMIDE-IMIDE

This is a division, of application Ser. No. 734,861, filed June 6, 1968, now abandoned.

This invention relates to new and useful compositions of matter. More particularly, it relates to novel polyamideimide polyamines and polyamideimide amic acids which are useful for preparing films, coatings and adhesives which cure to new polyamideimide-imides.

The preparation of polyamic acids by the reaction, under suitable conditions and using compatible solvents, of aromatic diamines and aromatic dianhydrides is well known and described, for example, in U.S. Pat. Nos. 3,179,614; 3,179,634 and 3,190,856. The preparation of polyamide-modified polyimides containing aromatic groups is also well known as set forth, for example, in U.S. Pat. Nos. 3,179,635 and 3,260,691. U.S. Pat. No. 3,179,635 teaches the preparation of reaction products of isophthoyl chloride and diamines which are further reacted with dianhydride to form polyamideimides. U.S. Pat. No. 3,260,691 teaches the reaction of the acid chloride of trimellitic anhydride and diamines to form useful linear polyamide amic acids which can be cured to form polyamideimides. While U.S. Pat. No. 3,260,691 mentions trimellitic anhydride as such, applicants have found that essentially only a dimer rather than a polymer is formed by the room temperature reaction of trimellitic anhydride and aromatic diamines such as methylene dianiline. U.S. Pat. No. 3,260,691 does not teach trimellitic anhydridediamine reaction products which are further reacted with dianhydride to form polyamideimide amic acids. British Pat. No. 570,850 also teaches the reaction of tricarboxylic acids such as trimellitic acid and their anhydrides and acid chlorides with diamines to product linear amideimides.

It has been found that when trimellitic anhydride as such, rather than its acid chloride, is used in the reaction with diamines, the subsequent room temperature reaction with dianhydride results in a useless gel except under very specific conditions as pointed out below.

It has now been found that polyamideimide polyamines as set forth herein provide useful tetracarboxylic acid dianhydride reaction products or polyamideimide amic acids which when cured have desirable characteristics including good flexibility, toughness and good electrical and other physical properties.

Those features of the invention which are believed to be novel are set forth with particularity in the claims appended hereto. The invention will, however, be better understood and further objects thereof appreciated from a consideration of the following description.

Briefly, the present invention relates to novel polyamideimide polyamines and to polyamideimide amic acids and polyamideimide-imides prepared therefrom. The polyamideimide polyamine is prepared by reacting at least one tricarboxylic monoanhydride having the formula

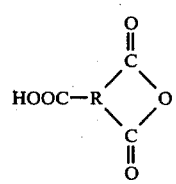

where R is a trivalent radical containing at least three carbon atoms and at least one aromatic diamine having the formula $$H_2H—R'—NH_2$$

where R' is a divalent aromatic group, the two amino radicals being attached to separate carbon atoms of the divalent group.

Trimellitic anhydride (TMA) is the preferred anhydride used in this invention.

Among the diamines which can be used are those listed in U.S. Pat. No. 3,179,614 and elsewhere, including benzidine, methylenedianiline (MDA), oxydianiline (ODA), metaphenylene diamine (MPDA), para-phenylene diamine (PPDA), and diaminodiphenylsulfone, among others.

In preparing the polyamideimide polyamine, the diamine is reacted with the tricarboxylic acid monoanhydride in molar ratios such that the diamine to anhydride molar ratio is always greater than one and such that x moles of anhydride are reacted with x+1 moles of diamine. Useful materials are obtained when x is a number up to about 20. This reaction can take place in the melt but preferably in a solvent such as phenol, cresol, dimethyl acetamide, dimethyl formamide, and N-methyl pyrrolidone, or any other high boiling solvent which is a non-reactant with the starting ingredients. The reaction is complete when, after reflux, the theoretical amount of water is obtained. These polyamines can also aptly be referred to as amine-terminated polyamideimides.

In preparing the polyamideimide amic acid, the polyamideimide polyamine intermediate is reacted with a tetracarboxylic dianhydride having the formula

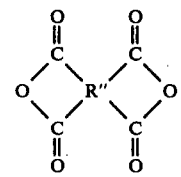

wherein R" is a tetravalent organic radical containing at least two carbon atoms selected from substituted and unsubstituted aliphatic, cycloaliphatic, heterocyclic, aromatic and combinations of such groups. Among the anhydrides useful in this connection are pyromellitic dianhydride (PMDA), 2,3,6,7-naphthalene tetracarboxylic dianhydride, meso-1,2,3,4-butanetetracarboxylic dianhydride (TCBA), para-phenylene bis(trimellitate) dianhydride, diphenyltetracarboxylic dianhydride, 1,2,5,6-naphthalene tetracarboxylic dianhydride, 2,2',3,3'-diphenyl tetracarboxylic dianhydride, 2,2-bis(3,4-dicarboxyphenyl)propane dianhydride, bis(3,4-dicarboxyphenyl) sulfone dianhydride, perylene 3,4,9,10-tetracarboxylic acid dianhydride, bis(3,4-dicarboxyphenyl) ether dianhydride, naphthalene-1,2,4,5-tetracarboxylic dianhydride, 2,2-bis(2,3-dicarboxyphenyl) propane dianhydride, 1,1-bis(2,3-dicarboxyphenyl) ethane dianhydride, 1,1-bis(3,4-dicarboxyphenyl) ethane dianhydride, bis(2,3-dicarboxyphenyl) methane dianhydride, bis(3,4-dicarboxyphenyl) methane dianhydride, benzene-1,2,3,4-tetracarboxylic dianhydride, pyrazine-2,3,5,6-tetracarboxylic dianhydride, thiophene-2,3,4,5-tetracarboxylic dianhydride, 3,4,3',4'-benzophenone tetracarboxylic dianhydride, among others.

The reaction between the dianhydride and polyamideimide polyamine is generally carried out by adding the dianhydride to the polyamic solutions and allowing the reaction to continue for up to several hours at room temperature. This results in a gel having a high imide content where the ratio of $x+1$ to $x$ is less than about five to four. When the ratio of $x+1$ to $x$ is greater than about five to four, a gel will generally form except when the above ratio is about 10 to 9 or greater.

In order to make useful products, it is necessary to heat the gelled reaction mixture to a temperature of about 100° C. to 150° C. for about at least one hour in order to obtain a soluble material which does not regel on cooling and is stable at room temperature. Alternatively, the anhydride can be added to the heated polyamine solution. The high imide group containing polymer solution thus obtained can be used as a wire coating, cast into films, used as an adhesive or for other desired purposes, and it becomes insoluble and non-melting when cured above 150° C. and preferably above 200° C. for times varying from about one hour to ten hours or dehydrated by other well known means.

The following examples will illustrate the practice of the invention, it being realized that they are to be taken as exemplary only and not as limiting in any way.

EXAMPLE 1

Under a nitrogen atmosphere and with exclusion of moisture, a stirred mixture of methylene dianiline (188 g, 0.94 mole), trimellitic anhydride (90 g, 0.47 mole), N-methylpyrrolidone (65 g), and xylene (70 ml) was gradually raised to the range of 128°–220° C. by removing portions of xylene at various times until 17 ml of water had been collected. The product was diluted with 1053 g of N-methylpyrrolidone to give a solution containing 19% solids. It will be noted that here the molar ratio of $x+1$ to $x$ is 2 to 1.

EXAMPLE 2

A solution made as in Example 1 (1361 g, 19% solids) was reacted at room temperature with meso-1,2,3,4-butane tetracarboxylic dianhydride (90.5 g) added all at once. The mixture was placed on a roller for 0.5 hour at which time a clear gel stage set in. The gelled material was placed in a 105° C. oven for 5 hours and the resulting fluid polymer solution refrigerated. The cooled product was filtered, diluted with 235 g of a 1:1 Solvesso 100:150 mixture with stirring, and placed on a roller for 0.5 hour.

The inherent viscosity was 0.21 and a flexible film was prepared by curing one hour at 100° C., one hour at 200° C., and one hour at 240° C. The polyamideimide amic acid was applied to 18 gauge copper wire and cured in six passes to a build of three mils on a wire tower having a top temperature of 340° C. and a bottom temperature of 325° C., the flexibility of the coating as measured at room temperature with 25% elongation was 1x which indicated no failure as by cracking and the like when the stretched wire was wound about a mandrel having the same diameter as the wire. The snap elongation test was withstood successfully, the single scrape abrasion as tested by standard methods was 1560 g and the repeated scrape was 76. The wire, when tested for heat shock by heating at 220° C. for one hour and being wound without stretching about a mandrel having the same diameter as the wire, was satisfactory. The cut-through temperature ranged from about 360° C. to 373° C. and the thermal life tested in accordance with I.E.E.E. No. 57 was 20,000 hours at 227° C.

EXAMPLE 3

A solution prepared as in Example 1 (348 g, 34% solids) was cooled to 110° C. and treated with 38.4 g of 1,2,3,4-butane-tetracarboxylic dianhydride with stirring. The temperature rose to 125° C. during five minutes and the polymer solution was cooled to room temperature. Here no gel was formed because the polyamine solution was hot to begin with. A flexible film was prepared from this polymer in 40% solids solution by curing one hour at 100° C, one hour at 200° C. and one hour at 240° C. The inherent viscosity was 0.135 (0.5% in N-methyl pyrrolidone).

EXAMPLE 4

A solution made as in Example 1 (138.2 g, 10% solids) was treated with 5.3 g of pyromellitic dianhydride. A gel formed almost immediately and was placed in a 110° oven for one hour. The resulting fluid polymer solution had an inherent viscosity of 0.49 and made a flexible film when cured one hour at 100° C., one hour at 200° C., and one hour at 240° C.

Wire coated with this material as in Example 2 above had a cut-through value of 520° C. and a flexibility at room temperature with 25% stretch of 5X.

EXAMPLE 5

A solution made as in Example 1 (263 g, 20% solids) was treated all at once with 29.9 g of benzophenone tetracarboxylic dianhydride. After 15 minutes on a roller, the product gelled. It was diluted to 20% solids with N-methyl pyrrolidone and placed in a 110° C. oven for three hours to give a fluid polymer solution. This polymer had an inherent viscosity of 0.585.

This sample had a cut-through value of 450° C. and a flexibility of 25% and 5x when applied to copper wire and cured on a wire tower as in Example 2.

EXAMPLE 6

A 138.00 g portion of 20% polyamine solution prepared as in Example 1 was heated to 85° C. with stirring under nitrogen. Then, during 67 minutes, 22.44 g of para-phenylene-bis(trimellitate) dianhydride, as a slurry in 100 g of pyrrolidone, was added in portions. During 55 minutes of this time, the temperature was kept in the range of 105°–150° C. to break the gel that formed. The final cooled fluid polymer was treated with Filter Aid and filtered on a pressure filter. Flexible-free films cured to 240° C. and 300° C. were made and the inherent viscosity of the solution was 0.555.

This polymer solution was coated on copper wire as in Example 2 showing cut-through values of 380°–385° C. and having a flexibility of 0% stretch of 2X. Where so designated, 240° C. film means cured one hour at 100° C., one hour at 200° C., one hour at 240° C., 300° C. film means 240° C. cure as above plus 20 minutes at 300° C.

EXAMPLE 7

Using the procedure of Example 1, 10 mole percent of the trimellitic anhydride was replaced by azelaic acid to give a polyamine in pyrrolidone at 20% solids. This solution, 584.5 g, was diluted with 183.2 g of pyrrolidone. The solution was heated to 100° C. with stirring under nitrogen and treated with 45.8 g of pyromellitic dianhydride. A gel formed, but by heating to a top temperature of 127° C. during 18 minutes, the gel broke. The fluid product was rapdily cooled, a solids content determination giving 19.3%. The inherent viscosity was 0.592 (0.5% solution in pyrrolidone). Flexible-free films were prepared when cured to both 240° C. (as described above) and 300° C. as in Example 4. When applied to copper wire, this enamel solution had a flexibility of 25%+4x and a cut-through of 440°-450° C.

EXAMPLE 8

Using the procedure in Example 1, oxydianiline was substituted for the methylenedianiline to give a polyamine at 20% solids in pyrrolidone.

A 111.40 gram portion of the solution was diluted with 72.55 g of pyrrolidone and heated to 100° C. With stirring and under nitrogen, 18.14 g of para-phenylene-bis (trimellitate) dianhydride was added. A gel formed almost immediately but broke on heating for 15 minutes at 145°-155° C. to give a fluid product. The product was rapidly cooled. The inherent viscosity was 0.395 and cured, tough films were prepared.

EXAMPLE 9

A 111.4 g portion of the polyamine solution from Example 8 was diluted with pyrrolidone (34.5 g), heated to 100° C. with stirring, and treated with 8.63 g pyromellitic dianhydride. A gel stage set in, but on heating at 130° C. to 155° C. for a short period, the gel broke. The polymer was cooled in an ice bath to room temperature and gave free, cured, tough films. The solution had an inherent viscosity of 0.297.

EXAMPLE 10

A 111.4 g portion of the solution prepared in Example 8 was diluted with pyrrolidone (51 g), stirred and heated to 100° C., treated with 12.7 g benzophenone tetracarboxylic dianhydride, giving a clear gel stage. By heating for a short time at 155°-171° C., the gel broke. The system was cooled to room temperature and gave flexible-free films when cured to 240° C. and 300° C. The solution had an inherent viscosity of 0.297.

EXAMPLE 11

By the procedure used in Example 1, a stirred mixture of oxydianiline (50 g, 0.25 mole), trimellitic anhydride (38.4 g, 0.20 mole), pyrrolidone (20.3 g), and xylene (40 ml) was heated from 142°-222° C. durng ten hours, giving 99% of the theoretical amount of water. The product was diluted to 20% solids with further pyrrolidone. Here the ratio of x+1 to x is as 5 is to 4. This intermediate is useful for further reaction with dianhydrides.

EXAMPLE 12

A 22.0800 g portion of 20% polyamine solution made according to Example 1 was treated with 0.4740 g of Curithane 103 (Upjohn, 2.3 functionality amine). A slurry of 1.9800 g 1,2,3,4-butane tetracarboxylic dianhydride in 9.8160 g pyrrolidone was added. The mixture was reacted for thirty minutes to give a homogeneous solution. After standing at room temperature for ten minutes further, a clear gel stage set in. By heating this product for 70 minutes at 104° C., it became fluid. Flexible films were prepared and cured to 240° C. and 300° C. as described above. The inherent viscosity of the solution was 0.28.

In another run, where the Curithane 103 portion made up 20 weight percent of the polyamine content, the resulting polymer solution had an inherent viscosity of 0.51 and gave flexible films.

EXAMPLE 13

A mixture of 198 g (1.0 mole) of MDA, 153.6 g (0.8 mole) of TMA, 88.0 g of NMP and 50 g of xylene was heated with stirring and under a nitrogen flush to a temperature of 216° C. for a total of eleven hours. A total of 28.7 g of water (99.7% of theory) was collected in the trap. Here x+1 to x is as 5 is to 4. The mixture was then diluted with 664 g of NMP to give a 30% solids solution of the intermediate.

(A) To a 107.5 g portion of the above solution was added 32.78 g of NMP and 3.92 g of TCBA. After stirring for a few minutes, the mixture gelled. The gel dissolved and a viscous polymeric solution was obtained after heating for six hours at 110° C. The polymer at this point had an inherent viscosity of 0.31.

Films of the material cast onto aluminum panels, cured for one hour at 100° C., one hour at 200° C., one hour at 240° C., and an additional one-half hour at 300° C., were found to be tough and flexible. This enamel was coated on copper wire and cured on a wire tower.

(B) To a second 107.5 g portion of the above solution was added 297 g of NMP and 9.07 g of para-phenylene bis(trimellitate) dianhydride. The material gelled immediately but the gel was again broken by heating for 21 hours at 110° C. to give a viscous polymer solution having an inherent viscosity of 0.51.

Cast films of this solution after curing as described above were tough and flexible.

EXAMPLE 14

A mixture of 198 g (1.0 mole) of MDA, 172.8 g (0.9 mole) of TMA, 132 g of NMP and 50 g of xylene was heated under nitrogen to a temperature of 211° C. for seven hours. Here x+1 is to x as 10 is to 9. A total of 32.6 g of water (100% of theory) was collected in the trap. The mixture was diluted with 1230 g of NMP to give a 20% solids solution of the intermediate.

(A) To a portion of the above solution (169.5 g) was added 1.78 g of TCBA. The mixture was stirred for one hour to give a viscous polymer solution having an inherent viscosity of 0.31. A film of the material after curing as described in the previous example was tough and flexible.

(B) To a second portion of the above solution (169.5 g) was added 1.92 g of PMDA. After stirring for one hour, the viscous polymer solution had an inherent viscosity of 0.40 from which was obtained a tough and flexible film. This trial was coated on copper wire and cured on a wire tower.

(C) To a third portion of the above solution (169.5 g) was added 4.03 g of para-phenylene bis(trimellitate) dianhydride. After stirring for one hour, the viscous polymer solution had an inherent viscosity of 0.36 and yielded a tough and flexible film after curing to 300° C.

There are provided, then, by this invention new and useful intermediates which can be utilized to prepare polyamideimide amic acids which can be cured to final polyamideimide-imide materials which are particularly useful as films, coatings and adhesives. Many other uses will occur to those skilled in the art.

What we claim as new and desire to secure by Letters Patent of the United States is:

1. The process for making a useful material from the gelled composition comprising the reflux reaction product in a compatible solvent of x moles of tricarboxylic monohydride having the formula

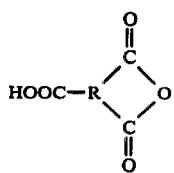

where R is a trivalent radical containing at least three carbon atoms and x is a number up to about 20 and x+1 mole of at least one diamine having the formula

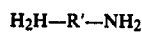

H₂H—R'—NH₂ where R' is a divalent aromatic group and where the ratio of x+1 to x is less than about 10 to 9, said reaction product being reacted with at least one dianhydride having the formula

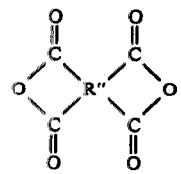

where R" is a tetravalent organic radical/containing at least two carbon atoms to form a gel containing polyamideimide amic acid which process comprises heating said gelled composition at a temperature of about 100° C. to 150° C. for at least one hour whereby said gel is broken.

* * * * *